US012154053B1

(12) United States Patent
Pareek et al.

(10) Patent No.: US 12,154,053 B1
(45) Date of Patent: Nov. 26, 2024

(54) SYSTEM FOR QUANTITATIVE SOFTWARE RISK DETERMINATION AND VISUALIZATION

(71) Applicant: Wells Fargo Bank, N.A., San Francisco, CA (US)

(72) Inventors: Mukul Pareek, Scarsdale, NY (US); Dipanjan Paul, Metuchen, NJ (US); Saulus Van Beurden, New York, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 617 days.

(21) Appl. No.: 17/303,779

(22) Filed: Jun. 7, 2021

(51) Int. Cl.
*G06Q 10/0635* (2023.01)

(52) U.S. Cl.
CPC ............... *G06Q 10/0635* (2013.01)

(58) Field of Classification Search
USPC ........................................ 705/7.28
See application file for complete search history.

(56) References Cited

U.S. PATENT DOCUMENTS

| | | | |
|---|---|---|---|
| 9,886,525 B1 * | 2/2018 | Soman | G06F 16/904 |
| 10,303,690 B1 | 5/2019 | Todd et al. | |
| 10,536,475 B1 | 1/2020 | McCorkle, Jr. et al. | |
| 2011/0154498 A1 * | 6/2011 | Fissel | H04L 63/1433 |
| | | | 715/764 |
| 2012/0232948 A1 * | 9/2012 | Wolf | G06Q 10/0635 |
| | | | 705/7.28 |
| 2014/0257918 A1 | 9/2014 | Spencer et al. | |
| 2015/0142509 A1 | 5/2015 | Treacey et al. | |
| 2015/0227869 A1 * | 8/2015 | Saraf | G06Q 10/0635 |
| | | | 705/7.28 |
| 2015/0356477 A1 | 12/2015 | Milkman et al. | |

(Continued)

OTHER PUBLICATIONS

Gomez et al., Risk-Based Criticality for Network Utilities Asset Management, 2019, IEEE Transactions on Network and Service Management, vol. 16, No. 2, pp. 755-768 (Year: 2019).*

(Continued)

*Primary Examiner* — Allison M Robinson
(74) *Attorney, Agent, or Firm* — SCHWEGMAN LUNDBERG & WOESSNER, P.A.

(57) ABSTRACT

A method may include retrieving an asset definition data file identifying data sources for features of an asset class, the features including controllable indicators and non-controllable indicators and for a plurality of assets, obtaining respective feature values for each asset of the plurality of assets based on the data sources. The method also includes segmenting the plurality of assets into a plurality of groups based on the non-controllable indicators and obtained feature values and computing a risk prioritization index for each asset in the plurality of assets based on the controllable indicators of the obtained feature values and generating an interactive visualization of the computed risk prioritization indexes. The method may include receiving a selection of a count in the interactive visualization, in response to the selection, retrieving a listing of assets in the plurality of assets within the group and the range corresponding to the selected count, and presenting the listing of assets in the interactive visualization.

20 Claims, 8 Drawing Sheets

(56) References Cited

U.S. PATENT DOCUMENTS

| | | | |
|---|---|---|---|
| 2016/0063631 A1* | 3/2016 | Wootton | G06Q 40/06 |
| | | | 705/36 R |
| 2016/0140466 A1 | 5/2016 | Sidebottom et al. | |
| 2019/0266526 A1 | 8/2019 | Knuff et al. | |
| 2020/0167705 A1 | 5/2020 | Risoldi et al. | |
| 2020/0233955 A1 | 7/2020 | Ramzan et al. | |
| 2021/0089978 A1* | 3/2021 | Girdhar | G06F 21/577 |

OTHER PUBLICATIONS

Krishnanand, R, "Practical Approach for Development of Risk Based Asset Management Program", Asset Management Conference Nov. 2014, (Nov. 2014), 5 pgs.

* cited by examiner

Application Name: Hypothetical Application

502 √ RPI Score: 760

Application Attributes
Application ID: App Identifier
Criticality: Criticality Level
Internet Accessible: Yes/No
System of Record: Yes/No
Payment Processing: Yes/No
Website: Yes/No
504 √ Customer Channels: Channel-n, Channel-m

Regulatory
Basel: Yes/No
BSA: Yes/No
CFTC: Yes/No
FINRA: Yes/No
GLBA: Yes/No
MNPI: Yes/No
PCI: Yes/No
SEC: Yes/No
SOC: Yes/No
Any other regulation: Y/N

Ownership
Technology Group: Tech Group Name
Technology Area: Tech Area Name

CIO: J Doe-w
CIO - 1: J Doe-x
CIO - 2: J Doe-y
Owner: J Doe-z

Vendor Information
Is this a vendor application: Yes/No
Software Type: Inhouse or not
Software Hosting: On-prem or not

Items Requiring Attention

| | Value | Score | Detail |
|---|---|---|---|
| Category-1 Risk Indicator 1 | 125 | 42 | Text informing detail on risk indicator |
| Category-1 Risk Indicator 2 | 38 | 36 | Text informing detail on risk indicator |
| Category-2 Risk Indicator 3 | Weak | 72 | Text informing detail on risk indicator |
| 506 √ Category-2 Risk Indicator 4 | Effective | 53 | Text informing detail on risk indicator |
| Category-3 Risk Indicator 5 | 4864 | 281 | Text informing detail on risk indicator |
| Category-3 Risk Indicator 6 | 29 | 63 | Text informing detail on risk indicator |
| Category-3 Risk Indicator 7 | NA | 145 | Text informing detail on risk indicator |
| Category-4 Risk Indicator 8 | Yes | 68 | Text informing detail on risk indicator |
| | | 768 | |

FIG. 5A

| RPI | Score Detail by Category & Metric | | Value | Score | Detail |
|---|---|---|---|---|---|
| Category-1 | Risk Indicator 1 | ● | 609 | nn | Detail text with additional explanation |
| | Risk Indicator 2 | ● | Ineffective | nn | Detail text with additional explanation |
| | Risk Indicator 3 | ● | Weak | nn | Detail text with additional explanation |
| | Risk Indicator 4 | ● | 175 | nn | Detail text with additional explanation |
| | Risk Indicator 5 | ● | Effective | nn | Detail text with additional explanation |
| Category-2 | Risk Indicator 6 | ● | Weak | nn | Detail text with additional explanation |
| | Risk Indicator 7 | ● | Ineffective | nn | Detail text with additional explanation |
| | Risk Indicator 8 | ● | Effective | nn | Detail text with additional explanation |
| | Risk Indicator 9 | ● | 177 | nn | Detail text with additional explanation |
| | Risk Indicator 10 | ● | NA | nn | Detail text with additional explanation |
| | Risk Indicator 11 | ● | Ineffective | nn | Detail text with additional explanation |
| | Risk Indicator 12 | ● | Weak | nn | Detail text with additional explanation |
| Category-3 | Risk Indicator 13 | ● | 940 | nn | Detail text with additional explanation |
| | Risk Indicator 14 | ● | 745 | nn | Detail text with additional explanation |
| | Risk Indicator 15 | ● | Ineffective | nn | Detail text with additional explanation |
| | Risk Indicator 16 | ● | 171 | nn | Detail text with additional explanation |
| Category-4 | Risk Indicator 17 | ● | Ineffective | nn | Detail text with additional explanation |
| | Risk Indicator 18 | ● | Ineffective | nn | Detail text with additional explanation |
| | Risk Indicator 19 | ● | Ineffective | nn | Detail text with additional explanation |
| Category-5 | Risk Indicator 20 | ● | Weak | nn | Detail text with additional explanation |
| | Risk Indicator 21 | ● | 183 | nn | Detail text with additional explanation |
| | Risk Indicator 22 | ● | Weak | nn | Detail text with additional explanation |
| | Risk Indicator 23 | ● | Ineffective | nn | Detail text with additional explanation |
| | Risk Indicator 24 | ● | 481 | nn | Detail text with additional explanation |

FIG. 5B

SYSTEM FOR QUANTITATIVE SOFTWARE RISK DETERMINATION AND VISUALIZATION

BACKGROUND

Synthesizing large data sets so that a user may understand metrics calculated based on the data sets is a difficult task. For example, for a large organization there are likely thousands of processes that have been established. The processes ultimately present some risk to the organization. For example, an organization may implement a web application to permit user account management. If the web application is inoperable, there is a risk that the organization's users will be unable to manage their account. Quantifying and visualizing the risk across thousands of processes such that action may be taken to lessen the risk presents numerous technical challenges.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

FIG. 5A is a user interface, according to various examples.

FIG. 5B is a user interface, according to various examples.

DETAILED DESCRIPTION

Figure 1:
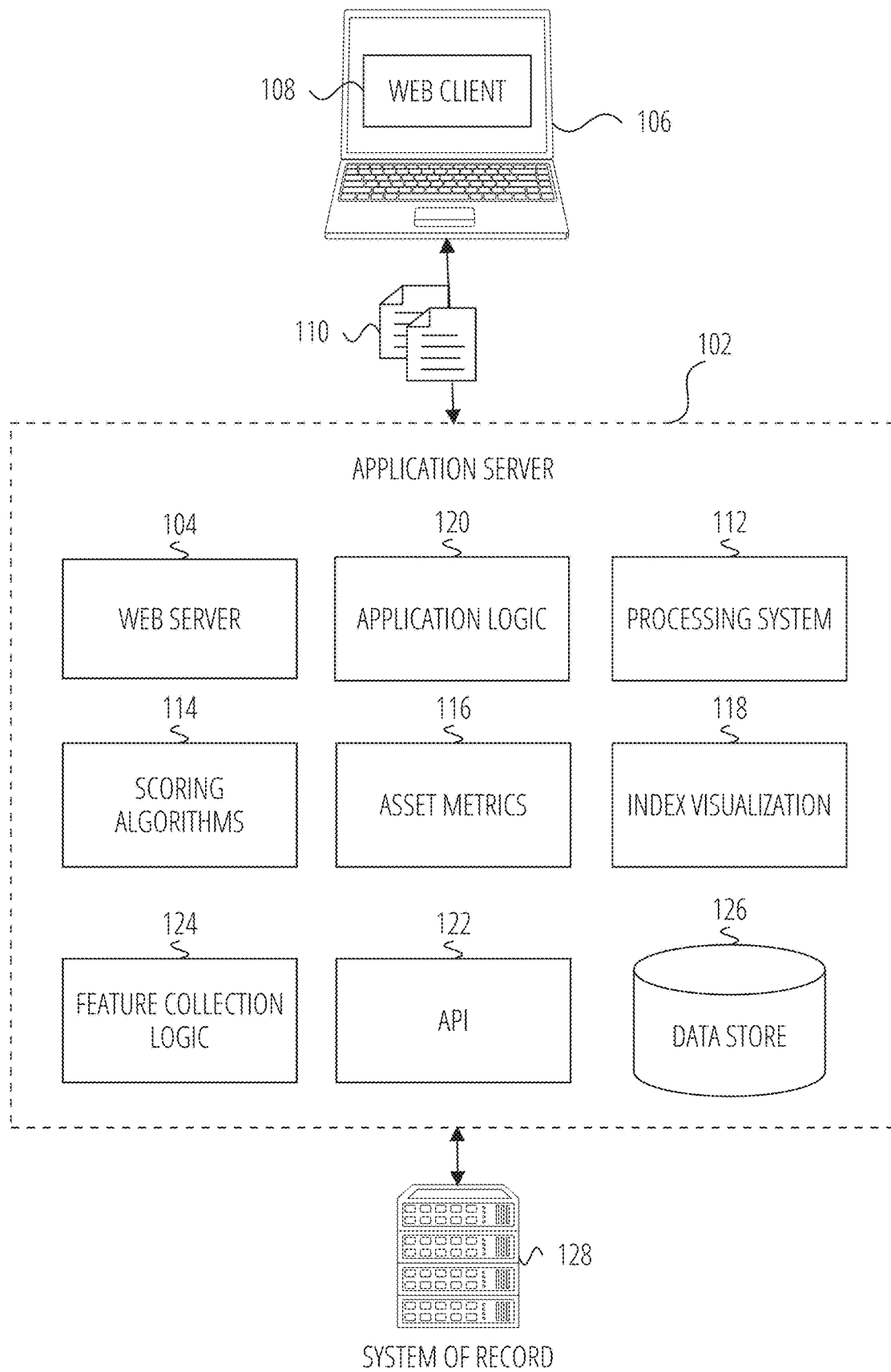
FIG. 1 is an illustration of components of a client device and an application server, according to various examples.

In the following description, for purposes of explanation, numerous specific details are set forth in order to provide a thorough understanding of some examples. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, hard drive) accessible by the component via an API or other program communication method. Similarly, the variables may be assumed to have a default values should a specific value not be described. User interfaces may be provided for an end-user or administrator to edit the variable values in some instances.

As indicated above, visualizing risk to an organization is a difficult task considering the amount of data available to an organization. A first challenge may be determining how to quantify the risk. In various examples, risk may have been determined by a person using qualitative descriptions. This type of risk measurement, however, suffers from the problem that not everyone may describe the risk the same way and calculations of the risk cannot reliably and readily be made. A second challenge, even if one assumes a quantitative approach is used, is determining how to determine risk such that assets (e.g., a software application) may be compared at the individual level and portfolio level. A third challenge is how to present the results of the risk measurement. For example, simply presenting a list of a assets and their risk may not lend itself to any action because not all assets may have the same importance to an organization. Thus, even though one asset may have a high risk value, that risk may be qualitatively lower than another asset with a lower risk value.

In view of the above problems, a new system is described that automates the generation of a new risk calculation and provide an interactive visualization tool for exploring the results of the calculation. The system uses a risk prioritization index (RPI), which may be a data driven methodology for computing risk scores at an asset level. An asset may be a logical group of similar items that may have decisions applied to them individually or collectively. For example, an asset may be a single software application in an organization and an asset may have its risk identified and measured. The end-results of the RPI may be a two-dimensional numerical matrix whose axes (or matrix indexes) represent risk levels and asset importance respectively on an ordinal scale with discrete categories.

In various examples, the RPI includes: (i) identification of risk indicators pertaining to the asset in questions; (ii) classification of these risk indicators as controllable and non-controllable; (iii) algorithmically combining measured values for the risk indicators, and (iv) a visual representing of the resulting data in a form that allows for interpretation and action.

In various examples, the foundation of the RPI system remains unchanged when applied to the various areas of operational risk such as technology risk, business continuity risk, reputational risk, fraud risk etc. The RPI system may allow for transforming subjective representations of risk into quantified scores that may then be used for comparison across risks, assets, entities, and for performing additional operations such as risk aggregation and attribution.

The RPI provides at least two ways for prioritizing risk prioritization efforts. First it may be done at the portfolio (of assets) level. The aggregated RPI score may allow for identification of the assets carrying the most risk, helping prioritize assets that require the most attention. Second, it may help at the asset level. At an individual asset's level, the RPI shows which risk indicators contribute the most to that asset's RPI score. Those indicators are the ones that help determine the prioritization for remediation or mitigation and create the most impact when deploying the limited number of resources of an organization. Using the RPI system as described above alleviates problems with prior risk determination systems. For example, the matrix visualization of the RPI scores permit user who may not understand any of the risk indicators to quickly see what assets have the highest risk to an organization.

FIG. 1 is an illustration of components of a client device and an application server, according to various examples. FIG. 1 includes application server 102, web server 104, client device 106, web client 108, data 110, processing system 112, scoring algorithms 114, asset metrics 116, index visualization 118, application logic 120, API 122, feature collection logic 124, data store 126, and system of record 128.

Client device 106 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces), In some embodiments, computing devices may comprise one or more of a touch screen, camera, keyboard, or microphone.

Client device 106 may be used by a user to view and interact with the visualized representation of the RPI. For example, the output may be served by application server 102 to client device 106 in the form of a web application that renders a two-dimensional matrix with respect to the risk a portfolio of assets. The risk measures as reflected in the risk indicators may form one axis of the matrix, and groups based on non-controllable indicators form the other as described in more detail below. A more detailed view may also be presented that allows a user to drill down to those assets that represent the greatest risk and the drivers of those risks.

Client device 106 and application server 102 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

Client device 106 and application server 102 may communicate data 110 over the network. Data 110 may include matrix data to be rendered in the form of a webpage on web client 108, Data 110 may also include commands from client device 106 to retrieve additional detail about a specific asset (e.g., a software application) and the factors that contribute to its RPI.

In some examples, the communication may occur using an application programming interface (API) such as API 122. An API provides a method for computing processes to exchange data. A web-based API (e.g., API 122) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 126).

APIs may also be defined in frameworks provided by an operating system (OS) to access data in an application that an application may not regularly be permitted to access. For example, an API on system of record 128 (e.g., a server) may establish calls for data access on the assets. Thus, application server 102 may use such an API to collect the data on the asset from system of record 128.

Application server 102 is illustrated as set of separate elements (e.g., component, logic, etc.). However, the functionality of individual elements may be performed by a single element. An element may represent computer program code that is executable by processing system 112. The program code may be stored on a storage device (e.g., data store 126) and loaded into a memory of the processing system 112 for execution. Portions of the program code may be executed in a parallel across multiple processing units (e.g., a core of a general purpose computer processor, a graphical processing unit, an application specific integrated circuit, etc.) of processing system 112. Execution of the code may be performed on a single device or distributed across multiple devices. In some examples, the program code may be executed on a cloud platform MICROSOFT AZURE® and AMAZON EC2®) using shared computing infrastructure.

Application server 102 may include web server 104 to enable data exchanges with client device 106 via web client 108. Although generally discussed in the context of delivering webpages via the Hypertext Transfer Protocol (HTTP), other network protocols may be utilized by web server 104 (e.g., File Transfer Protocol, Telnet, Secure Shell, etc.). A user may enter in a uniform resource identifier (URI) into web client 108 (e.g., the INTERNET EXPLORER® web browser by Microsoft Corporation or SAFARI® web browser by Apple Inc.) that corresponds to the logical location (e.g., an Internet Protocol address) of web server 104. In response, web server 104 may transmit a web page that is rendered on a display device of a client device (e.g., a mobile phone, desktop computer, etc.).

Additionally, web server 104 may enable a user to interact with one or more web applications provided in a transmitted web page. A web application may provide user interface (UI) components that are rendered on a display device of client device 106. The user may interact (e.g., select, move, enter text into) with the UI components, and, based on the interaction, the web application may update one or more portions of the web page, A web application may be executed in whole, or in part, locally on client device 106. The web application may populate the UI components with data from external sources or internal sources (e.g., data store 126) in various examples. In various examples, the application is an interactive representation of the RPI for a portfolio of assets.

The web application may be executed according to application logic 120. Application logic 120 may use the various elements of application server 102 to implement the web application and calculate any underlying data used therein. For example, application logic 120 may issue API calls to retrieve or store data from data store 126 and transmit it for display on client device 106. Similarly, data entered by a user into a UI component may be transmitted using API 122 back to the Web Server. Application logic 120 may use other elements (e.g., scoring algorithms 114, asset metrics 116, index visualization 118, feature collection logic 124, etc.) of application server 102 to perform functionality associated with the web application as described further herein.

Data store 126 may store data that is used by application server 102. Data store 126 is depicted as singular element, but may in actuality be multiple data stores. The specific storage layout and model used in by data store 126 may take a number of forms indeed, a data store 126 may utilize multiple models. Data store 126 may be, but is not limited to, a relational database (e.g., SQL), non-relational database (NoSQL) a flat file database, object model, document details model, graph database, shared ledger (e.g., blockchain), or a file system hierarchy. Data store 126 may store data on one or more storage devices (e.g., a hard disk, random access memory (RAM), etc.). The storage devices may be in standalone arrays, part of one or more servers, and may be located in one or more geographic areas. In various examples, data store 126 may store the RPI score for one or more portfolios of assets.

A generalized overview of the RPI process is presented below. A more specific implementation with respect to software applications is then discussed with respect to FIG. 2 and FIG. 3 using the elements of FIG. 1 such as asset metrics 116, feature collection logic 124, scoring algorithms 114, and index visualization 118.

As discussed above, RPI is a generalized two-part data driven methodology for computing risk scores at an asset level (where an 'asset' may be any component entity for which risks are identified and measured) and prioritizing the combination of asset attributes and risk factors requiring attention and supporting a fully interpretable "what-if" analysis process for accurately identifying the actionable next steps. The resulting matrix represents the counts of assets at the intersection of the risk and importance scales that are determined using the process described herein.

The first part of the methodology is based on first categorizing assets into homogeneous groups based on their static attributes. As a second part, the methodology allows for identification of a subset of assets within each homogeneous group that are outliers based on a peer-to-peer comparison of how these assets performed on a given set of controllable factors over a given period of time.

In various examples, an "asset" is a unit of aggregation against which risks are identified and measured. For example, in the context of technology, individual software applications may be considered an asset. The combined set of all asset instances would comprise the asset portfolio. In various examples, an asset reflects the natural intuitive understanding of the asset as recognized in a business context. For example, individual customers could be considered asset instances, each carrying their specific risk to an institution they deal with. However, depending on the use case in certain scenarios, groups of similar customers may be a better candidate to be considered assets for the purposes of RPI.

In various examples, a risk refers to something that can go wrong and thus creates an outcome that makes it difficult for an organization to achieve an objective (e.g., keeping computer systems online, etc.) In previous attempts at categorizing risk, the standard industry terminology often refers to 'inherent risk', which is a measure of the impact and severity of a risk without considering the mitigation provided by controls (e.g., insurance). Additionally, there is 'residual risk' that describes the net risk to the organization that remains after accounting for the mitigation provided by controls and other risk avoidance and risk transfer measures put in place. The RPI avoids these distinctions by using upon risk indicators that are intuitive towards understanding and managing risks.

For the purposes of RPI, risks may be measured using quantified risk indicators may be attributes or metrics that have a correlation with risk realization. For example, a high count of unaddressed security defects is correlated with the risk of a malicious attacker exploiting them; hurting the interests of the organization. In various examples, the absolute correlation may matter, but whether the correlation of a risk to a risk indicator is positive or negative is only a matter of polarity. The correlation of the risk indicators to the risk may not need to be mathematically established for it to be useful. For example, it may be sufficient that there is a logical reasoning that connects the risk indicator to the risk, or a causative relationship be understood by experts in the field.

Risk indicators may be considered to be of two broad types: controllable indicators and non-controllable indicators.

In various examples, controllable indicators are risk indicators internal to the organization and controlled by the design and execution of its processes. These may be controllable in the sense that the quantified value of the indicator may be adjusted up or down by making changes which are within the organization's control. For example, a high count of open security defects may be brought down by a concerted effort to do so in a compressed timeframe.

In various examples, non-controllable indicators are indicators or attributes inherent the asset over which the organization has little control. For example, a mobile software application serving external customers may be open to anyone who chooses to install it including malicious actors who may use such access for reverse-engineering, hacking or other exploitation. The nature of the business may not allow the organization to change this risk increasing attribute (hence making it a non-controllable indicator).

The RPI may determine asset risks along two dimensions (or axes). In a first axis a risk measurement that is used to determine how an asset is doing on each of the controllable risk indicators covered by the RPI. Second, it looks at the integral and innate attributes or characteristics of an asset that have an impact on the risk to the asset; for example, whether a customer is US based or offshore, or, to continue the software application asset analogy, whether the asset is internet facing, or the part of a payment processing critical process.

Figure 4:
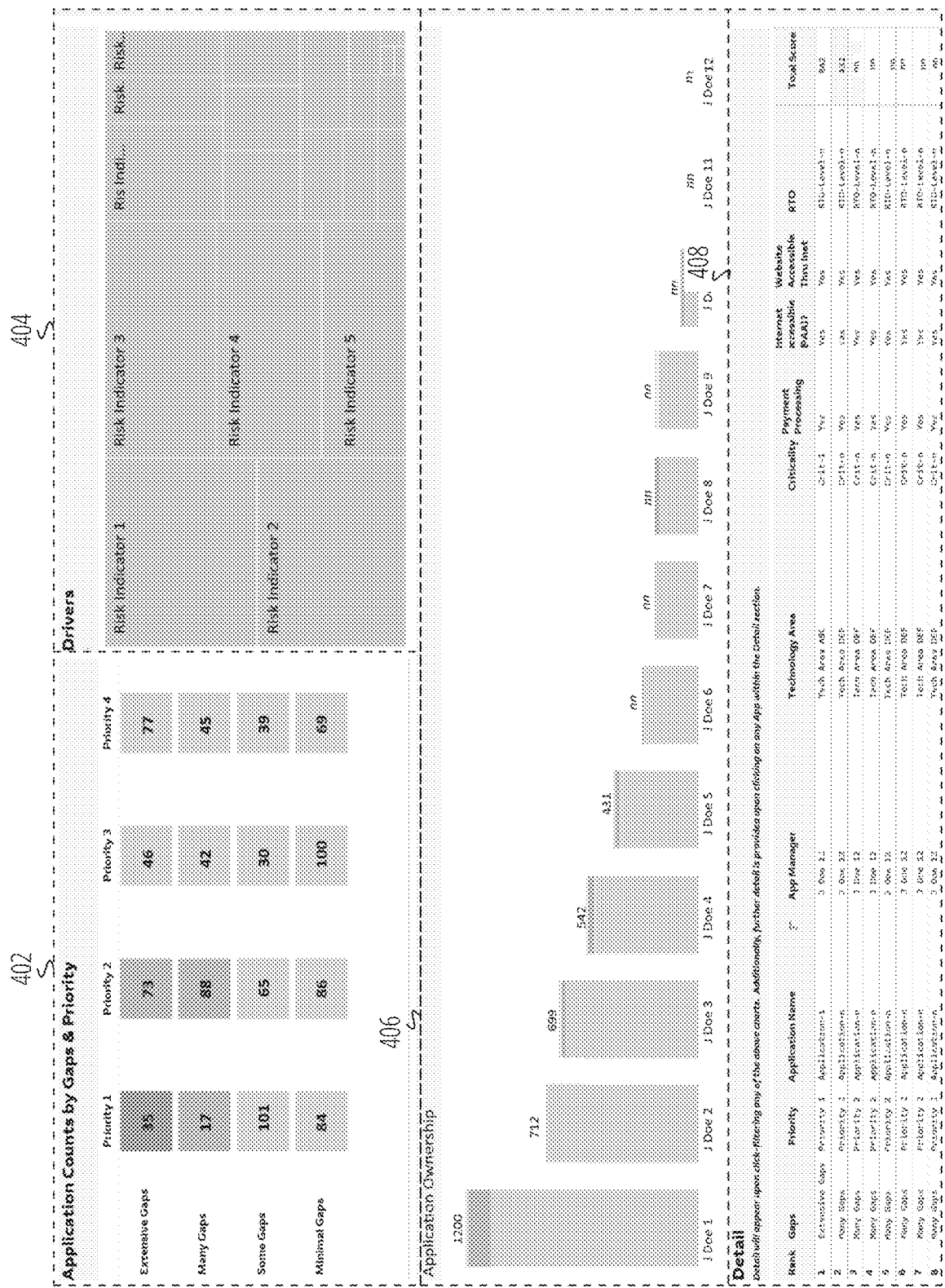
FIG. 4 is a user interface, according to various examples.

The combination of the above two may be displayed together in a single graphic such as illustrated in FIG. 4, The RPI recognizes that in a situation where two assets have the same risk related score performance, a higher inherent risk asset may require much greater prioritization than a lower risk asset (e.g., an internal timesheet system).

The RPI helps distinguish between, and leverages both, risk measurement (of controllable risk indicators) and the measures of non-controllable indicators to provide a concise visual risk message suitable for consumption by users that may not know or understand the underlying details. In addition to providing a large overview, application server 102 also configures the visualization to allow drill-down capabilities into its components to see what risk indicator are the primary contributors to a RPI of an asset. A primary visualization for the RPI may be a prioritized 2-dimensional n×n matrix for communicating concisely the state of the asset portfolio from a risk perspective. The risk measures as reflected in the risk indicators form one axis of the matrix, and the priority groupings (based on the non-controllable indicators for an asset portfolio) form the other. Additionally, more detailed views allow action by helping identify critical assets carrying the most risk, and the precise risk indicators that require attention.

Figure 2:
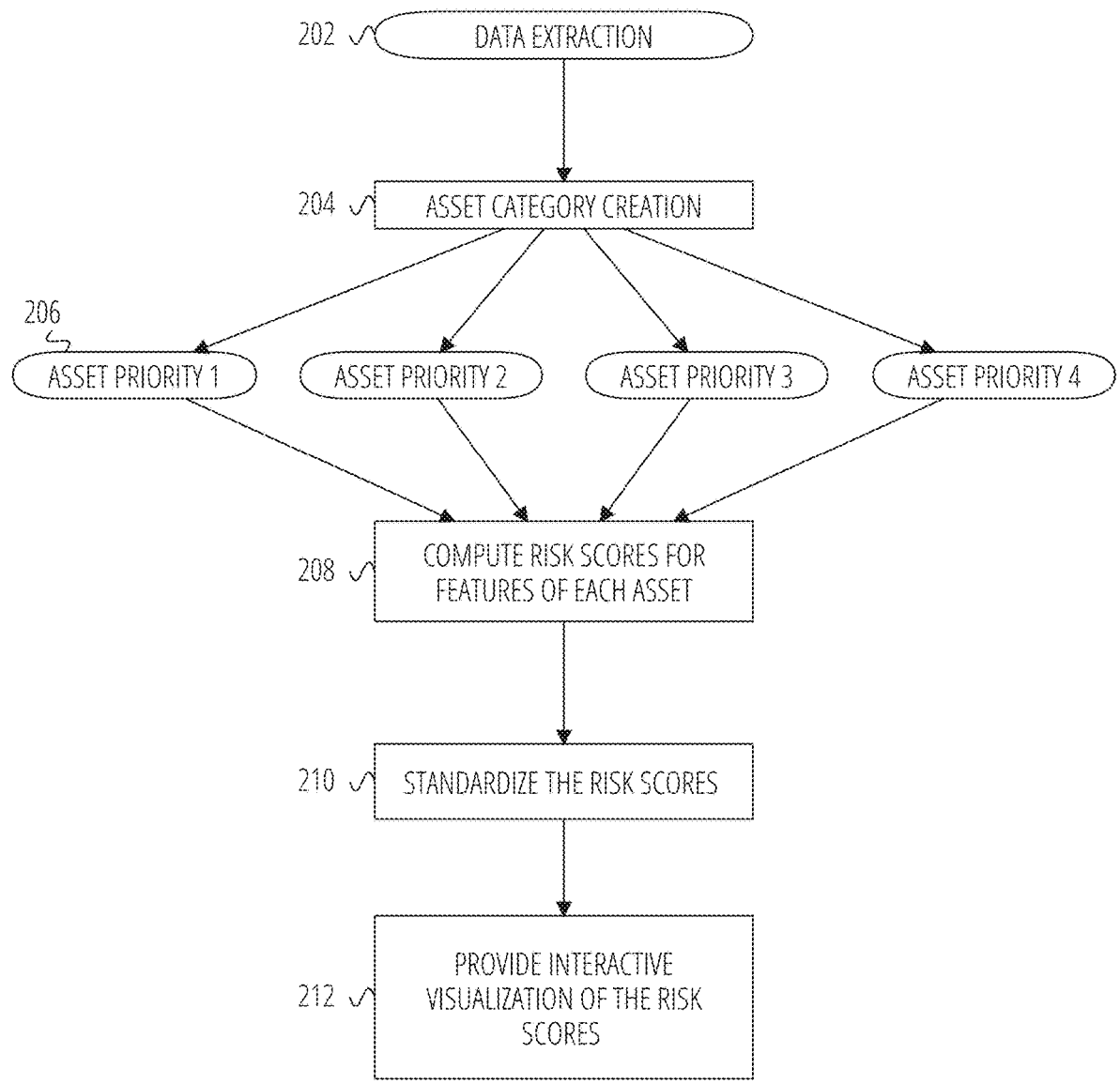
FIG. 2 is an illustration of generating a risk prioritization index, according to various examples.

FIG. 2 is an illustration of generating a risk prioritization index, according to various examples. FIG. 2 is discussed in the context of a portfolio of software applications where every application is considered an asset for which risk measurements (both controllable and non-controllable) are available and stored in a database (e.g., data store 126). For discussion purposes consider that an asset is a single software application in an organization. Generally, an organization may have a large number of software applications, which taken as a set, would comprise the asset portfolio (also referred to as an application portfolio). The precise details of this example (e.g., the indicators, grouping criteria, scoring algorithms) are only for illustration purposes and others may be used without departing from the scope of this disclosure.

Controllable indicators for an asset such as a software application, but include, but are not limited to:
- The count of hardware assets associated with the application that are past vendor support
- The count of application related software vulnerabilities
- Whether access to the application is controlled or not
- Whether the application is behind a firewall
- Counts of monthly changes to the application that have to be rolled-back due to bugs discovered
- Counts of production outages attributed to the application
- The count of unpatched software relating to the application Non-controllable indicators may include, but are not limited to:
- Whether the application is internee facing
- The count of application users
- The time within which any application failures are expected to be resolved to prevent losses (the shorter this timeframe, the higher the inherent risk)
- Whether the application is required to support any regulatory requirements (e.g., Sarbanes-Oxley, GLBA, privacy regulations etc)
- Whether the application is considered to be a part of the organization's critical infrastructure (e.g., for a banking organization, if it supports payment processing for customer ACH transfers)

The method of a generating a risk prioritization index may begin at data extraction operation 202. In this operation, which may be performed by feature collection logic 124, the values for the controllable indicators and non-controllable indicators may be gathered and stored for further processing. In various examples, a feature of an asset may refer to either a non-controllable indicator or controllable indicator. Feature collection logic 124 may collect data for active applications within the organization from multiple systems of records and standardize them to generate risk features for each application. Application server 102 may identify a system of record for each risk feature, in various examples and transmit request to, or receive data from, the system of record to obtain values for the risk feature.

A system of record may refer to the authoritative source or trusted derivative thereof for a given element of information (e.g., a risk feature). For example, a software vulnerability scanning tool may be the system of record for vulnerabilities identified. A risk feature may be an individual measurable attribute or characteristic of the application. The line-of-business served by the software application, number of users of the application, the count of known software defects in the application, the absence or presence of certain controls in the application are examples of features. Although the list of features tends to stay generally constant over a period of time, periodically new features may be added, or old features can be retired from the process without impacting the overall efficacy of the scoring process or the computed scores.

Features are extracted for each software application and stored in a database (e.g., data store 126). The feature may generally be chosen in a way that they either reflect on the importance of the asset (in the current illustration, software application) to the organization, or the risk the asset poses to achieving the organization's goals. In various examples, application server 102 stores a list of the features (and the data source) for each asset in order to allow feature collection logic 124 to obtain the values for the features.

As indicated above the visualization includes one axis based on the RPI of an asset based on the controllable indicators and the other based on a prioritization grouping based on the non-controllable indicators. Accordingly, at asset category creation 204 application server 102 may segment the assets into a plurality of groups. The groups may be determined based on non-controllable features, which are often static in nature and do not necessarily change over a shorter period of time. In various examples, the asset groups may be determined in one of two ways.

In one manner, application groupings into peer groups are based on thresholds or filters applied to these non-controllable features. The features, thresholds or filters are determined based on a combination of administrator identified areas and logical groupings based on judgment. For example, the following groupings may be used and the criteria stored in data store 126 for automatic grouping:
- Priority 1: Critical, payment apps that are approved publicly accessible OR requiring recovery in 2 hours of outage (either condition)
- Priority 2: Critical and approved publicly accessible, OR payment app, OR requiring recovery in 2 hours of outage (any condition)
- Priority 3: Internet facing/approved publicly accessible apps, or payment apps other than non-critical applications
- Priority 4: All other applications Another method of grouping may be used if the feature set is too large and does not lend itself to judgment-based categorization. In such an instance, statistical clustering techniques such as k-means may be used to determine natural clusters identified by the data.

While the non-controllable set of features may be utilized to determine the categories for each application, the set of controllable features are utilized for peer-to-peer comparisons within each category of applications, and thus contribute towards the calculation of the risk score. The controllable indicators are dynamic measures are expected to change over a period of time depending on how the application owners manage the risk attributes for their applications. One goal of the described methodology is to utilize this set of controllable features to compute an overall risk index score for each application, and use the index as drivers to change application behavior and improve its risk performance index over time.

At compute risk operation 208, the risk index score may be calculated for each asset. In various examples, the calculation methodology is stored in scoring algorithms 114 of application server 102. There may be different scoring algorithms used depending on how a feature is classified. For example, ordinal features that have categories such as high, medium, low, etc., may use one algorithm; numerical features may use another. Examples of both types are illustrated in FIG. 3.

Figure 3:
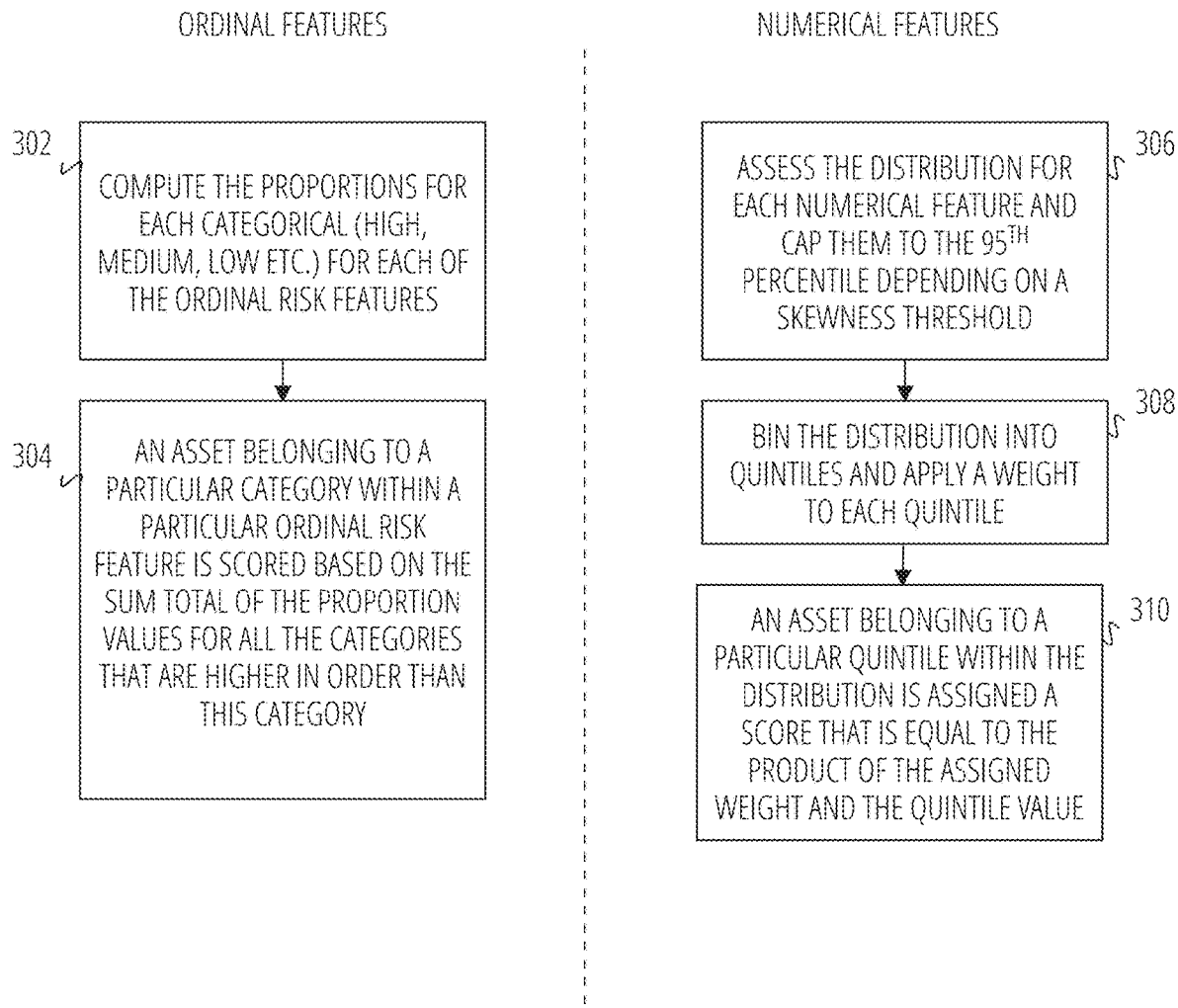
FIG. 3 is an illustration of scoring methodologies, according to various examples.

FIG. 3 is an illustration of scoring methodologies, according to various examples. On the left-hand side, a method for scoring features with ordinal values is depicted and on the right-hand side a method for scoring features with numerical values is depicted.

At operation 302, scoring algorithms 114 may compute the proportions for each categorical (HIGH, MEDIUM, LOW ETC.) value for each of the ordinal risk features. At operation 304, an asset belonging to a particular category within a particular ordinal risk feature is scored based on the sum total of the proportion values for all the categories that are higher in order than this category. Accordingly, the score calculation for each asset for each controllable risk feature is a function of the rarity of the value for the given feature for the asset in question compared to its peers in the portfolio.

As a more concrete example, consider that an ordinal feature has three values; high, medium, and low and that the order is High>Medium>Low. Further consider that the score for this feature is 0-100. At operation 302 it may be determined that 70% of the assets are rated 'High', 20% 'Medium', and 10% 'Low.' Accordingly, for an asset that is rated is "low," the score would be 90 (as 70% plus 20% of the assets are better than the asset in question).

With respect to numerical measurements, some preparation steps may be used. For example; risk indicator values may need to be converted to percentages in situations where the total population size needs to be considered to interpret a risk meaningfully. For example, when thinking of the adverse impact of production changes to systems, it may be sensible to consider what proportion of changes to an application resulted in an outage as opposed to the raw count of outages. This may allow for a consideration of fast changing applications that have a large number of changes in a period as opposed to low-activity slower-moving and more stable applications that may have few or zero changes. Converting to a percentage may include converting raw numbers to percentages by dividing by an appropriate denominator. The score for an asset may be equal to the percentage calculated above for that asset divided by the max percentage for that risk indicator considering all assets.

In another example, sometime the maximum value of an indicator in the case of highly skewed distributions may need to be capped. This may occur in situations where the risk is by-and-large well controlled in an organization, but occasional outliers create an extremely skewed distribution. In such cases, it may be useful to cap the maximum value for the distribution to be an appropriate percentile, for example the $99^{th}$ or $95^{th}$ percentile. If this is not done, the resulting scores may be desensitized to risk at the lower end of the scale and the RPI will not be able to identify such risk. Accordingly, at operation 306 the distribution for each numeric feature may be assess and cap them to the 95th (or other chosen) percentile depending on a skewness threshold. Capping may take the form of replacing with the cap value the value for all observations where the observed value is greater than the cap. In other words, the observed value is replaced by MAX(Observed Value, Capped Value).

At operation 308, the distribution is binned into quintiles and a weight applied to each quintile (as discussed in operation 310). For example, for each asset, determine the quintile (1 to 5) to which the observation belongs. Note that for skewed variables several quintiles may overlap, in which case the quintile value to be used should be the lowest value. At operation 310, in various examples, an asset belonging to a particular quintile within the distribution is assigned a score that is equal to the product of the assigned weight and the quintile value. For example, for assets in the worst (e.g., 5th) quintile will receive a multiplier of 5. A numerical; continuous variable can have a value anywhere on the number-line. Although quintiles are used, other segmentations may be used.

In various examples, an exponential function (e.g., exp (risk_indicator_score)) may be applied to the risk indicator scores. The exponential function may provide the needed accentuation even within the quintiles and be smoother and continuous in some instances. In either case, at the end of operation 310, each controllable indicator will have a risk indicator score for the asset that may be used in calculating the RPI.

With reference back to FIG. 2, at operation 210, the risk scores may be standardized. For example, the overall score for an application is computed based on a two-step process. First an interim score is computed for each application (e.g., asset) based on a linear sum of the individual scores that were attributed by each controllable risk indicator scored as described above. Once the interim score is computed, the scores are standardized across all applications and fitted into a scale of 0 to 1000 (one aggregate score for each asset), or other suitable scale depending upon the organization's needs. The individual contributing scores are accordingly standardized to reflect this ratio. One reasons for the standardization is to provide drill down ability to identify the highest contributing factors to the overall score and also allow easier interpretability and comparison over time and across assets and entities.

Once standardized, the risk scores for each asset may be assigned their respective percentiles and grouped by risk scores into appropriate controllable risk groupings. For example:

Extensive Risks: Assets with scores that lie in the top 5%
Many Risks: Assets with scores in the next 20%
Some Risks: Assets with scores in the next 25%
Minimal Risks: Remaining 50% of the assets Using the above groupings, the highest anomalies (e.g., those in extensive risks and priority 1) may be highlighted to allow for users to address those applications with respect to the identified areas of concern.

At visualize operation 212, application server 102 may generate one or more visualizations of the resulting RPI for the assets. For example, with a risk score for each asset, and a categorization known for each asset, one visualization may be a matrix which shows the categories (e.g., Priority-1, 2 etc) along one axis, and the count of assets in each risk category (e.g., extensive, many, some, and minimal risks) along the other axis. Examples of these visualizations are discussed below.

FIG. 4 is an example interactive user interface, according to various examples. FIG. 4 includes matrix visualization 402, driver section 404, application ownership section 406, and selection detail section 408. The arrangement and sizes of the user interface elements are just one example of a possible output of index visualization 118 that is presented to a user on client device 106. An interface such as shown in FIG. 4 may be the result of a user logging into application server 102 and selecting an asset type. In response to the selection, application server 102 may dynamically perform the operations depicted in FIG. 2. In other examples, application server 102 may retrieve cached data that includes the RPI for each asset to generate the interface.

As depicted, matrix visualization 402 includes a matrix with the prioritization categories based on non-controllable indicators as columns and groupings of assets by RPI distribution (based on controllable indicators) as rows. The numbers may represent the count of assets in each combination. Different colors may be used to highlight the importance of certain combinations. For example, the extensive gaps and priority 1 may be the darkest shade of a color, and the priority 4 and minimal risk combination in the lightest shade of the color.

Driver section 404 may present a visualization of what risk indicators contribute the most to the scores in the assets. The size of each block may be proportional to the total score of the assets. For example, if the sum of all the RPI scores for the assets was 1000 and the sum of the value of a risk indicator across all assets was 100, the size of the block would be 10% of the overall size. Other shapes may be used without departing from the scope of this disclosure.

The colors in matrix visualization 402 may correlate with application ownership section 406 in various examples. For example, application ownership section 406 may list the various owners (e.g., those users responsible for the asset) of the assets in matrix visualization 402. The columns may represent the sum of their assets RPI scores. Thus, J Doe 1 has a score of 1200. One can also see that although J Doe 2 has a higher overall score than J Doe 3, J Doe 2 has more assets that are in need of help based on the shading.

Selection detail section 408 may provide details based on what is selected by a user in the other sections. For example, if a user selects the '35' block in matrix visualization 402, selection detail section 408 may list the top applications by total score of assets within that block. Driver section 404 may also be updated to include only those risk indicators, and sized according to their relative contributions, for the 35 applications. Or, if a user selects a particular person or section of that person's bar in application ownership section 406, selection detail section 408 may filter to those related assets.

FIG. 5A is a user interface, according to various examples. The user interface may be presented in response to a user clicking an application from an interface such as presented in FIG. 4. As illustrated, FIG. 5B includes application overview section 502, application details section 504, and scoring details section 506. As illustrated application overview section 502 includes the name of the application and its RPI score. Application details section 504 may include the attributes of the application, regulatory information, and ownership information. Some of the information presented in application details section 504 may correspond to risk features.

Scoring details section 506 may include the raw score for a risk indicator as well as its value when calculating the RPI for the asset. This may be useful in visualizing how individual components (e.g., controllable indicators) are scored and their relative importance to computing the overall RPI for an asset. For example, for risk indicator 1 the value is '125' but the score that was used in the RPI was '42.' Risk indicator 3 presents an example of how an ordinal risk feature with a "Weak" value is translated to a score of 72 for RPI calculation purposes.

FIG. 5B is a user interface, according to various examples. FIG. 5B may be presented below FIG. 5A on the same webpage in various examples. As illustrated, FIG. 5B presents a detailed view of the risk indicators and their categorizations.

Figure 6:
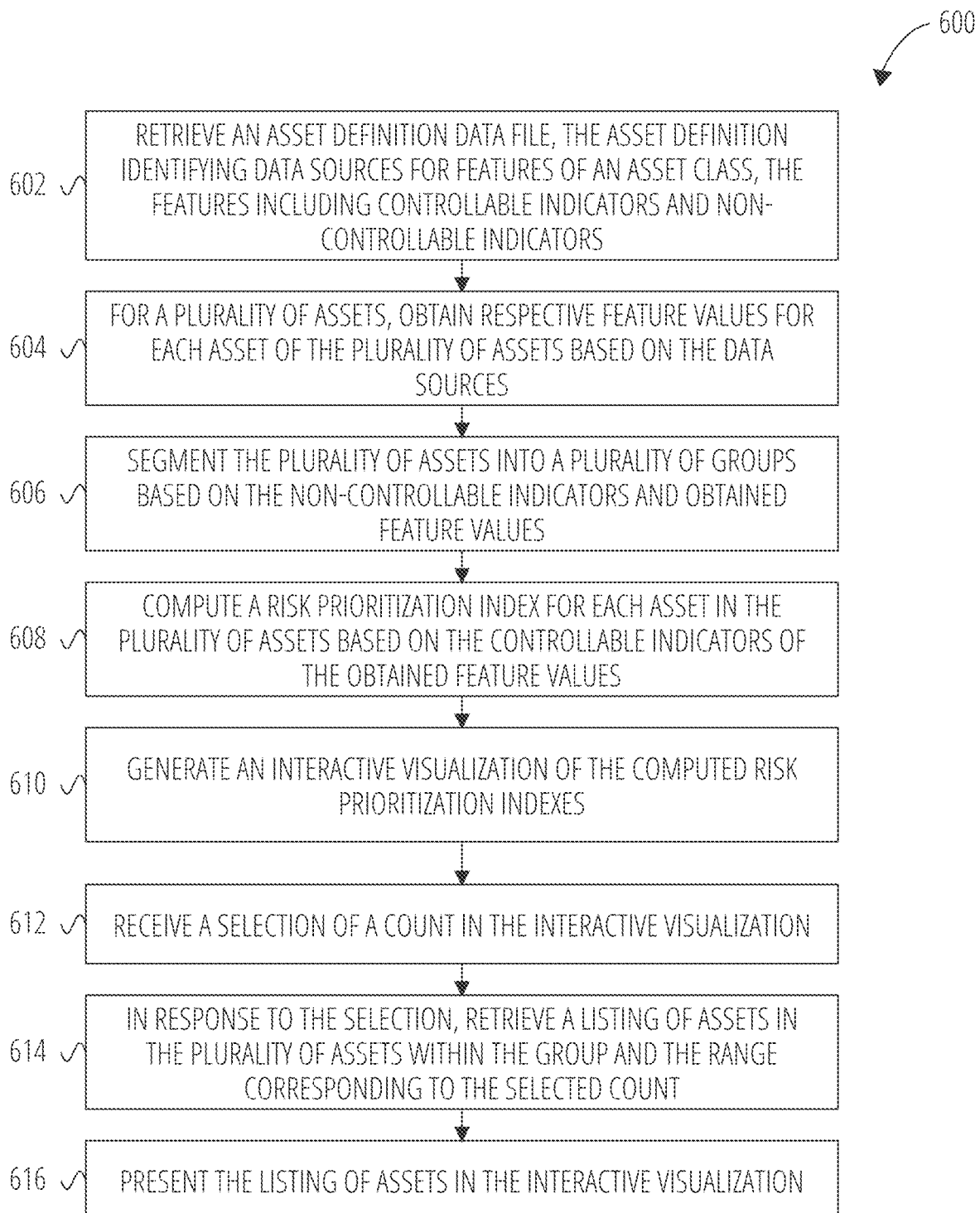
FIG. 6 illustrates a flowchart 600 in accordance with one embodiment.

FIG. 6 is a flowchart illustrating a method, according to various examples. The method is represented as a set of blocks 602-616 that detail operations of the method. The method may be embodied in a set of instructions stored in at least one computer-readable storage device of a computing device(s) such as application server 102. A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in the blocks. The one or more processors may instruct other component of the computing device(s) to carry out the set of instructions. For example, the computing device may instruct a network device to transmit data to another computing device or the computing device may provide data over a display interface to present a user interface.

In various examples at block 602, the method retrieves an asset definition data file, the asset definition identifying data sources for features of an asset class, the features including controllable indicators and non-controllable indicators. The asset definition data file may be stored data store 126 and be formatted in a standard format (AXIL). Within the asset definition data file there may be entries for the controllable indicators and the non-controllable indicators and a system of record (e.g., a data source) for each indicator.

In various examples at block 604, the method may for a plurality of assets, obtain respective feature values for each asset of the plurality of assets based on the data sources. In various examples, feature collection logic 124 of application server 102 may be used to obtain the values from data sources as described above with respect to data extraction operation 202 in FIG. 2.

In various examples, at block 606, the method may segment the plurality of assets into a plurality of groups based on the non-controllable indicators and obtained feature values. In various examples, the segmentation may be performed according to defined criteria in the asset definition data file and may be performed as described with respect to asset category creation 204.

In various examples, at block 608, the method may compute a risk prioritization index for each asset in the plurality of assets based on the controllable indicators of the obtained feature values. In various examples, the computation may be completed using the operations described in compute risk operation 208, operation 210, and the operations depicted in FIG. 3.

In various examples, at block 610, the method may generate an interactive visualization of the computed risk prioritization indexes, wherein the interactive visualization includes a first axis based on the plurality of groups, a second axis with range intervals based on a value range of the risk prioritization indexes, and at each intersection of a group and range interval of the second axis, a count of the plurality of assets within the group and the range interval. In various examples, the interactive visualization may be matrix visualization 402 as described by visualize operation 212 using index visualizations 118.

In various examples, at block 612, the method may receive a selection of a count in the interactive visualization. For example, a user may click on a box surrounding the number or the number itself.

In various examples, at block 614, the method may in response to the selection, retrieve a listing of assets in the plurality of assets within the group and the range corresponding to the selected count.

In various examples, at block 616, the method may include presenting the listing of assets in the interactive visualization. For example, the listing may be presented in a manner as illustrated in selection detail section 408.

The computer-implemented method may also include where the asset is a software application and where a non-controllable indicator of the non-controllable indicators is a count of application users.

The computer-implemented method may also include where the asset is a software application and where a controllable indicator of the controllable indicators is a count of production outages attributed to the software application.

The computer-implemented method may also include where the interactive visualization further includes a controllable indicators driver section that identifies controllable indicators having a greatest impact on a sum of risk prioritization indexes for the plurality of assets. In various examples, the driver section may be formatted as driver section 404.

The computer-implemented method may also include where the interactive visualization further includes an asset ownership section that identifies an aggregate risk prioritization index score for assets assigned to an owner based on the computed risk prioritization indexes for those assets assigned to the owner. In various examples, the asset ownership section may be formatted as application ownership section 406.

The computer-implemented method may also include where computing a risk prioritization index for each asset in the plurality of assets based on the controllable indicators of the obtained feature values for a respective asset includes converting an ordinal value of a controllable indicator to a numerical value based on a percentage of assets in the plurality of assets having a value for the ordinal value better than the respective asset. In various example, the conversion may occur using a process as described in operation 302 and operation 304.

The computer-implemented method may also include where computing a risk prioritization index for each asset in the plurality of assets based on the controllable indicators of the obtained feature values includes, for a respective asset having a numerical value of a controllable indicator, limiting a maximum value for the numerical value based on a distribution of numerical values for the controllable indicator; and wherein the risk prioritization index for the asset is further based on multiplying the numerical value by a weight, the weight based on which quintile the numerical value is within the distribution of numerical values. In various examples, the numerical value may be determined and modified as discussed further in operations 306, 308, and 310.

The computer-implemented method may also include further includes receiving a selection of an asset in the listing of assets, and presenting in the interactive visualization, scores for component controllable indicator values for the selected asset that make up the risk prioritization index for the selected asset. In various example, the scores are presented as formatted in scoring details section 506.

Figure 7:
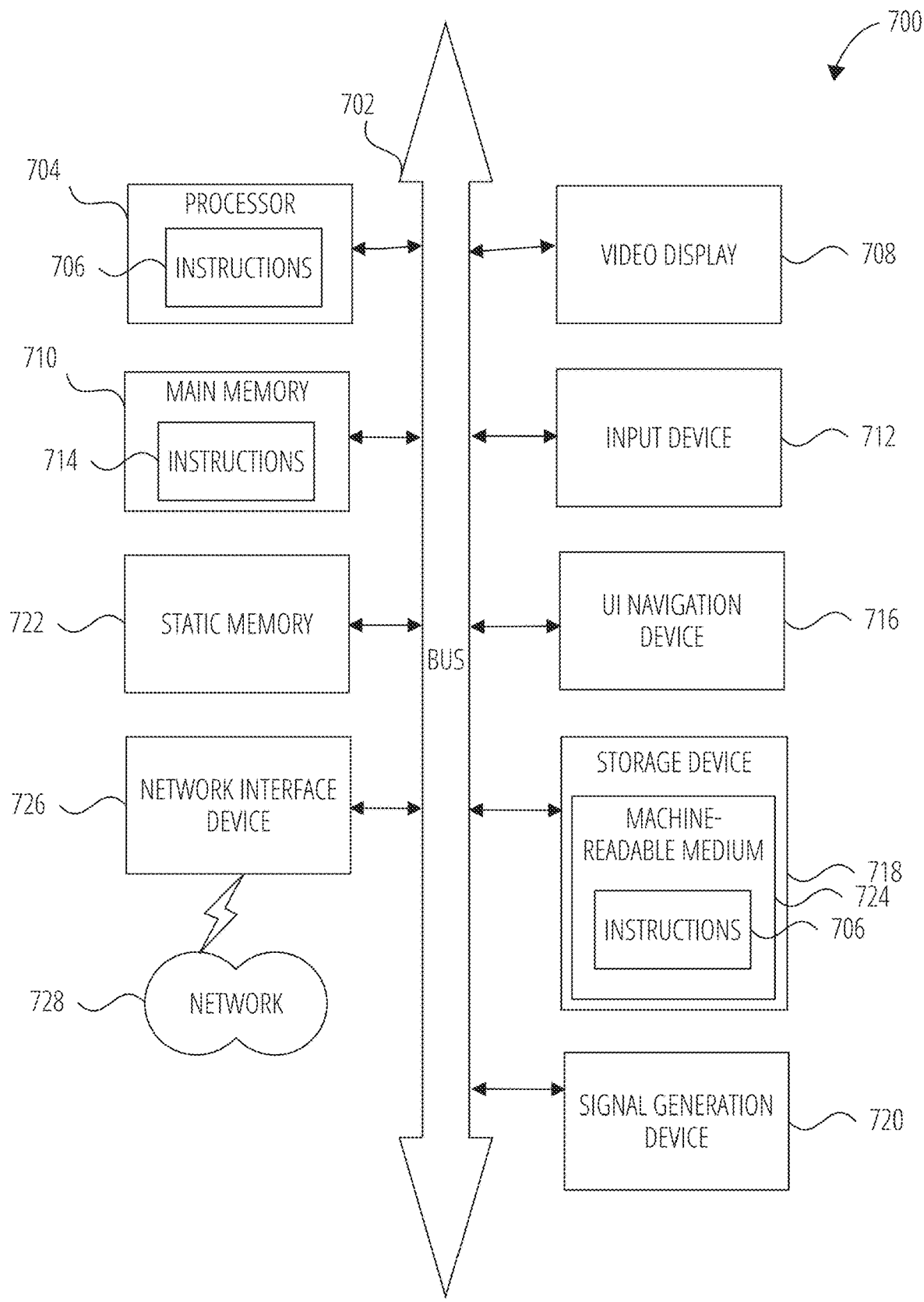
FIG. 7 is a block diagram illustrating a machine in the example form of computer system, within which a set or sequence of instructions may be executed to cause the machine to perform any one of the methodologies discussed herein, according to various examples.

FIG. 7 is a block diagram illustrating a machine in the example form of computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 704 (e.g., a central processing unit (CPU), a graphics processing unit (GPU) or both, processor cores, compute nodes, etc.), a main memory 710 and a static memory 722, which communicate with each other via a bus 702. The computer system 700 may further include a video display 708, an input device 712 (e.g., a keyboard), and a user interface (UI) navigation device 114 (e.g., a mouse) In one embodiment, the video display 708, input device 712, and UI navigation device 716 are incorporated into a single device housing such as a touch screen display. The computer system 700 may additionally include a storage device 718 (e.g., a drive unit), a signal generation device 720 (e.g., a speaker), a network interface device 726, and one or more sensors (not shown), such as a global positioning system (GPS) sensor, compass, accelerometer, or other sensors.

The storage device 718 includes a machine-readable medium 724 on which is stored one or more sets of data structures and instructions 714 (e.g., software) embodying or utilized by any one or more of the methodologies or functions described herein. The instructions 714 may also reside, completely or at least partially, within the main memory 710, static memory 722, and/or within the processor 704 during execution thereof by the computer system 100, with the main memory 710, static memory 722, and the processor 704 also constituting machine-readable media.

While the machine-readable medium 724 is illustrated in an example embodiment to be a single medium, the term "machine-readable medium" may include a single medium or multiple media (e.g., a centralized or distributed Database, and/or associated caches and servers) that store the one or more instructions 714. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 724 that excluded transitory signals.

The instructions 714 may further be transmitted or received over a communications Network 126 using a transmission medium via the network interface device 726 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein

What is claimed is:

1. A computer-implemented method using a least one processing unit,
    the method comprising
    retrieving an asset definition data file, the asset definition data file identifying:
        features of an asset class and data sources for obtaining values of the features, the features including controllable indicators and non-controllable indicators; and
        grouping criteria for the non-controllable indicators;
    for a plurality of assets, obtaining respective feature values for each asset of the plurality of assets based on the data sources;
    segmenting the plurality of assets into a plurality of groups based on the grouping criteria for the non-controllable indicators and obtained feature values of the non-controllable indicators;
    computing a risk prioritization index for each asset in the plurality of assets based on the controllable indicators of obtained feature values of the controllable indicators;
    presenting an interactive visualization of the computed risk prioritization indexes, wherein the interactive visualization includes:
        a matrix visualization portion including:
            a first axis based on the plurality of groups;
            a second axis with range intervals based on a value range of the risk prioritization indexes; and
            at each intersection of a group and range interval of the second axis, an application count shape identifying a count of the plurality of assets within the group and the range interval;
        a driver visualization portion including a plurality of risk indicator shapes, the plurality of risk indicator shapes corresponding to the controllable and non-controllable indicators; and
        an asset listing portion;
    receiving a selection of an application count shape in the matrix visualization portion; and
    in response to the selection:
        retrieving a listing of assets in the plurality of assets within the group and the range corresponding to the selected application count shape;
        presenting the listing of assets in the asset listing portion automatically updating the driver visualization to remove risk indicator shapes that are not associated with the selected application count shape; and
        resizing remaining risk indicator shapes in the plurality of risk indicator shapes after the updating.

2. The computer-implemented method of claim 1, wherein the asset is a software application and wherein a non-controllable indicator of the non-controllable indicators is a count of application users.

3. The computer-implemented method of claim 1, wherein the asset is a software application and wherein a controllable indicator of the controllable indicators is a count of production outages attributed to the software application.

4. The computer-implemented method of claim 1, wherein the interactive visualization further includes:
    a controllable indicators driver section that identities controllable indicators having a greatest impact on a sum of risk prioritization indexes for the plurality of assets.

5. The computer-implemented method of claim 1, wherein the interactive visualization further includes:
    an asset ownership section that identifies an aggregate risk prioritization index score for assets assigned to an owner based on the computed risk prioritization indexes for those assets assigned to the owner.

6. The computer-implemented method of claim 1, wherein computing a risk prioritization index for each asset in the plurality of assets based on the controllable indicators of the obtained feature values includes:
    for a respective asset, converting an ordinal value of a controllable indicator to a numerical value based on a percentage of assets in the plurality of assets having a value for the ordinal value better than the respective asset.

7. The computer-implemented method of claim 1, wherein computing a risk prioritization index for each asset in the plurality of assets based on the controllable indicators of the obtained feature values includes:
    for a respective asset having a numerical value of a controllable indicator, limiting a maximum value for the numerical value based on a distribution of numerical values for the controllable indicator; and
    wherein the risk prioritization index for the asset is further based on multiplying the numerical value by a weight, the weight based on which quintile the numerical value is within the distribution of numerical values.

8. The computer-implemented method of claim 1, further comprising: receiving a selection of an asset in the listing of assets; and
    presenting in the interactive visualization, scores for component controllable indicator values for the selected asset that make up the risk prioritization index for the selected asset.

9. A system comprising:
    a processor; and
    a memory storing instructions that, when executed by the processor, configure the processor to:
        retrieve an asset definition data file, the asset definition data file identifying:
            features of an asset class and data sources for obtaining values of the features, the features including controllable indicators and non-controllable indicators; and
            grouping criteria for the non-controllable indicators;
        for a plurality of assets, obtaining respective feature values for each asset of the plurality of assets based on the data sources;
        segment the plurality of assets into a plurality of groups based on the grouping criteria for the non-controllable indicators and obtained feature values of the non-controllable indicators;

compute a risk prioritization index for each asset in the plurality of assets based on the controllable indicators of obtained feature values of the controllable indicators;

present an interactive visualization of the computed risk prioritization indexes, wherein the interactive visualization includes:

a matrix visualization portion including:

a first axis based on the plurality of groups;

a second axis with range intervals based on a value range of the risk prioritization indexes; and at each intersection of a group and range interval of the second axis, an application count shad identifying a count of the plurality of assets within the group and the range interval;

a driver visualization portion including a plurality of risk indicator shapes, the plurality of risk indicator shapes corresponding to the controllable and non-controllable indicators; and an asset listing portion;

receive a selection of an application count shape in the matrix visualization portion; and in response to the selection:

retrieve a listing of assets in the plurality of assets within the group and the range corresponding to the selected application count shape;

present the listing of assets in the asset listing portion automatically update the driver visualization to remove risk indicator shapes that are not associated with the selected application count shape; and resize remaining risk indicator shapes in the plurality of risk indicator shapes after the updating.

10. The system of claim 9, wherein the asset is a software application and wherein a non-controllable indicator of the non-controllable indicators is a count of application users.

11. The system of claim 9, wherein the asset is a software application and wherein a controllable indicator of the controllable indicators is a count of production outages attributed to the software application.

12. The system of claim 9, wherein the interactive visualization further includes:

a controllable indicators driver section that identifies controllable indicators having a greatest impact on a sum of risk prioritization indexes for the plurality of assets.

13. The system of claim 9, wherein the interactive visualization further includes:

an asset ownership section that identifies an aggregate risk prioritization index score for assets assigned to an owner based on the computed risk prioritization indexes for those assets assigned to the owner.

14. The system of claim 9, wherein computing a risk prioritization index for each asset in the plurality of assets based on the controllable indicators of the obtained feature values includes:

for a respective asset, convert an ordinal value of a controllable indicator to a numerical value based on a percentage of assets in the plurality of assets having a value for the ordinal value better than the respective asset.

15. The system of claim 9, wherein computing a risk prioritization index for each asset in the plurality of assets based on the controllable indicators of the obtained feature values includes:

for a respective asset having a numerical value of a controllable indicator, limit a maximum value for the numerical value based on a distribution of numerical values for the controllable indicator; and wherein the risk prioritization index for the asset is further based on multiplying the numerical value by a weight, the weight based on which quintile the numerical value is within the distribution of numerical values.

16. The system of claim 9, wherein the instructions, which when executed by the processor, further configure the processor to:

receive a selection of an asset in the listing of assets; and present in the interactive visualization, scores for component controllable indicator values for the selected asset that make up the risk prioritization index for the selected asset.

17. A non-transitory computer-readable storage medium, the computer-readable storage medium including instructions that when executed by at least one processor, cause the at least one processor to:

retrieve an asset definition data file, the asset definition data file identifying:

features of an asset class and data sources for obtaining values of the features, the features including controllable indicators and non-controllable indicators; and grouping criteria for the non-controllable indicators;

for a plurality of assets, obtaining respective feature values for each asset of the plurality of assets based on the data sources;

segment the plurality of assets into a plurality of groups based on the grouping criteria for the non-controllable indicators and obtained feature values of the non-controllable indicators;

compute a risk prioritization index for each asset in the plurality of assets based on the controllable indicators of obtained feature values of the controllable indicators;

present an interactive visualization of the computed risk prioritization indexes, wherein the interactive visualization includes:

a matrix visualization portion including:

a first axis based on the plurality of groups;

a second axis with range intervals based on a value range of the risk prioritization indexes; and at each intersection of a group and range interval of the second axis, an application count shape identifying a count of the plurality of assets within the group and the range interval;

a driver visualization portion including a plurality of risk indicator shapes, the plurality of risk indicator shapes corresponding to the controllable and non-controllable indicators; and an asset listing portion;

receive a selection of an application count shape in the matrix visualization portion; and in response to the selection:

retrieve a listing of assets in the plurality of assets within the group and the range corresponding to the selected application count shape;

present the listing of assets in the asset listing portion automatically update the driver visualization to remove risk indicator shapes that are not associated with the selected application count shape, and resize remaining risk indicator shapes in the plurality of risk indicator shapes after the updating.

18. The computer-readable storage medium of claim 17, wherein the asset is a software application and wherein a non-controllable indicator of the non-controllable indicators is a count of application users.

19. The computer-readable storage medium of claim 17, wherein the asset is a software application and wherein a controllable indicator of the controllable indicators is a count of production outages attributed to the software application.

20. The computer-readable storage: medium of claim 17, wherein the interactive visualization further includes:
- a controllable indicators driver section that identifies controllable indicators having a greatest impact on a sum of risk prioritization indexes for the plurality of assets.

* * * * *